(12) United States Patent
Yang (10) Patent No.: US 8,270,014 B2
(45) Date of Patent: Sep. 18, 2012

(54) PRINTING METHOD, RECORDABLE MEDIUM RECORDED WITH A PROGRAM TO EXECUTE THE METHOD AND HOST APPARATUS

(75) Inventor: Seung-sik Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 12/272,848

(22) Filed: Nov. 18, 2008

(65) Prior Publication Data

US 2009/0147302 A1   Jun. 11, 2009

(30) Foreign Application Priority Data

Dec. 7, 2007  (KR) .................. 10-2007-0127081

(51) Int. Cl.
*G06F 15/00* (2006.01)
*G06F 15/16* (2006.01)
(52) U.S. Cl. ...................... 358/1.15; 709/219
(58) Field of Classification Search .................. 358/1.13, 358/1.14, 1.15, 1.1, 1.18, 1.16; 709/219, 709/246, 221; 715/276, 255; 340/525, 461
See application file for complete search history.

(56) References Cited

U.S. PATENT DOCUMENTS

| | | | |
|---|---|---|---|
| 6,798,530 B1 * | 9/2004 | Buckley et al. | ............ 358/1.13 |
| 2003/0090694 A1 * | 5/2003 | Kennedy et al. | ............ 358/1.13 |
| 2005/0190399 A1 | 9/2005 | Nakaoka et al. | |
| 2005/0254080 A1 | 11/2005 | Kim | |

FOREIGN PATENT DOCUMENTS

| | | |
|---|---|---|
| JP | 2001130115 | 5/2001 |
| JP | 2005275483 | 10/2005 |
| JP | 2006347100 | 12/2006 |
| KR | 20050077868 | 8/2005 |
| KR | 20050109129 | 11/2005 |
| KR | 1020060024847 | 3/2006 |

OTHER PUBLICATIONS

Korean Office Action Issued on Mar. 29, 2012 in KR Patent Application No. 10-2007-0127081.

* cited by examiner

*Primary Examiner* — Saeid Ebrahimi Dehkordy
(74) *Attorney, Agent, or Firm* — Stanzione & Kim, LLP (57) ABSTRACT

A printing method includes converting an image data which is created by an application program into an EMF (Enhanced Meta File), storing the EMF converted from the image data, displaying information with respect to the stored EMF, selecting at least one stored EMF of a plurality of stored EMFs, and converting the selected EMF into a printing data.

20 Claims, 7 Drawing Sheets

PRINTING METHOD, RECORDABLE MEDIUM RECORDED WITH A PROGRAM TO EXECUTE THE METHOD AND HOST APPARATUS

CROSS-REFERENCE TO RELATED APPLICATIONS

This application claims priority under 35 U.S.C 119(a) from Korean Patent Application No. 10-2007-0127081, filed on Dec. 7, 2007 in the Korean Intellectual Property Office, the disclosure of which is incorporated herein in its entirety by reference.

BACKGROUND OF THE INVENTION

1. Field of the Invention

The present general inventive concept relates to a printing method, a recordable medium recorded with a program to execute the method and a host apparatus, and more particularly, to a printing method of reprinting an image data, a recordable medium recorded with a program to execute the method, and a host apparatus.

2. Description of the Related Art

A printer is an apparatus which is connected to a host apparatus such as a personal computer and prints an image data which is made by an application program installed in the host apparatus on a printing medium. The printer includes a MFP (Multi Function Printer), a laser printer, and an inkjet printer.

A printer driver which is used to drive the printer is installed in the host apparatus and a user configures a print option that is needed for printing, for example, a size of the printing medium, an orientation of the printing medium, or a watermark function by using the printer driver when the user commands to print the image data made by the application program. The printer driver converts the image data into a printing data which can be recognized by the printer and if the printing data is transferred to the printer, a printing job is performed by the printer which prints the printing data.

However, if a user wants to re-print the same image data made by the application program several times, the user has to execute the application program to retrieve the image data and properly re-configure the needed print option whenever the user tries to print the image data. In this case, it is inconvenient for the user to repeatedly execute the application program and re-configure the print option.

According to a printing data management method disclosed in the Korean patent publication number 2005-0077868, if a printing command is given, a document which is made by an application program is converted to a printing data along with information needed for printing and the printing data is stored in the host apparatus. If the user needs to print the same document, the stored printing data can be transferred to the printer without the user's executing the application program and re-configuring the print option. Accordingly, the user can re-print the document without the application program.

However, in the case of the above printing data management method, it is not proper to store all of the printing data for a long time because the total amount of the printing data is large. In addition, it takes long time to retrieve the stored printing data if a preview function of the stored printing data is executed. The above method also adversely affects a user's convenience since a separate program than the application program is used to perform the preview function. Particularly, if a large number of the stored printing data exists, it is troublesome to search and print a specific printing data from the stored printing data.

SUMMARY OF THE INVENTION

The present general inventive concept provides a printing method, a recordable medium recorded with a program to execute the method, and a host apparatus to easily and conveniently reprint an image data.

Additional aspects and/or utilities of the present general inventive concept will be set forth in part in the description which follows and, in part, will be obvious from the description, or may be learned by practice of the present general inventive concept.

The present general inventive concept also provides a printing method, a recordable medium recorded with a program to execute the method, and a host apparatus to easily manage a printing data.

The foregoing and/or other aspects and utilities of the present general inventive concept may be achieved by providing The foregoing and/or other aspects and utilities of the present general inventive concept may also be achieved by providing The foregoing and/or other utilities of the present general inventive concept may also be achieved by providing a printing method which includes converting an image data which is created by an application program into an EMF (Enhanced Meta File), storing the EMF converted from the image data, displaying information on the stored EMF, selecting at least one of a plurality of the stored EMFs, and converting the selected EMF into a printing data.

The printing method may further include searching the EMF, wherein the information on the EMF to be searched is not displayed.

The information on the stored EMF may include at least one of a preview of the stored EMF and related information on the stored EMF.

The displaying may include displaying the preview corresponding to the selected EMF.

The preview of the stored EMF may correspond to a first page of the stored EMF.

The preview of the stored EMF may correspond to one of pages of the stored EMF selected by a user.

The displaying may include displaying the information in a printing menu provided by at least one of the application program and a printer driver.

The printing method may further include checking whether the EMF converted from the image data is stored If a printing command of the image data is given.

The printing method may further include querying a user whether a new EMF is created from the image data if it is determined that the EMF converted from the image data is stored.

The printing method may further include creating a new EMF from the image data if it is determined that the EMF converted from the image data is stored and overwriting the previously converted EMF with the new EMF.

The foregoing and/or other aspects and utilities of the present general inventive concept may also be achieved by providing a computer readable medium storing a program to execute a printing method of an image forming apparatus which includes converting an image data which is created by an application program into an EMF (Enhanced Meta File), storing the EMF converted from the image data, displaying information on the stored EMF, selecting at least one of a plurality of the stored EMFs, and converting the selected EMF into a printing data.

The foregoing and/or other aspects and utilities of the present general inventive concept may also be achieved by providing a host apparatus connected to a printer which includes a storage unit, a printer driver to be installed in the storage unit and to drive the printer, an application program installed in the storage unit, a file processor to convert an image data created by the application program into an EMF (Enhanced Meta File) and to store the EMF in the storage unit, a printing data converter to convert an image data into a printing data, a data transmitter to transmit a data to the printer, and a controller to control the file processor to convert the image data into the EMF and to store the EMF in the storage unit, to control the printing data converter to convert the EMF into the printing data and to control the data transmitter to transmit the printing data to the printer if a printing command of the image data is given.

The host apparatus may further include an EMF checker to search the EMF stored in the storage unit, wherein the controller the EMF checker to search the EMF stored in the storage unit if the printing command of the image data is given.

The host apparatus may further include a UI (user interface) part, and wherein the controller the UI part to create a query UI to query a user whether a new EMF is created from the image data if it is determined that the previously converted EMF of the image data is stored in the storage unit.

The host apparatus may further include a UI (user interface) part to create a file information UI to display information of the stored EMF on a display apparatus according to the control of the controller.

The file information UI may include at least one of a standard UI to display related information on the stored EMF and a preview UI to preview contents of the EMF.

The preview UI may be provided by least one of the printer driver and the application program.

The foregoing and/or other aspects and utilities of the present general inventive concept may also be achieved by providing an image forming apparatus which includes an image forming unit, a controller which receives a first signal representing at least one Enhanced Meta File (EMF) of an image data, stores the first signal representing the at least one EMF of an image data, converts the first signal representing the at least one EMF of an image data into a second signal representing a printing data, and transmits the second signal to the image forming unit.

The controller may search the first signal representing the at least one EMF of an image data.

The foregoing and/or other aspects and utilities of the present general inventive concept may also be achieved by providing a printing method of an image forming apparatus which includes converting a first signal representing an image data file into a second signal representing an Enhanced Meta File (EMF), storing the second signal representing the EMF transmitting a display signal representing information with respect to the stored second signal, and converting the second signal into a print signal representing a print data.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 1:
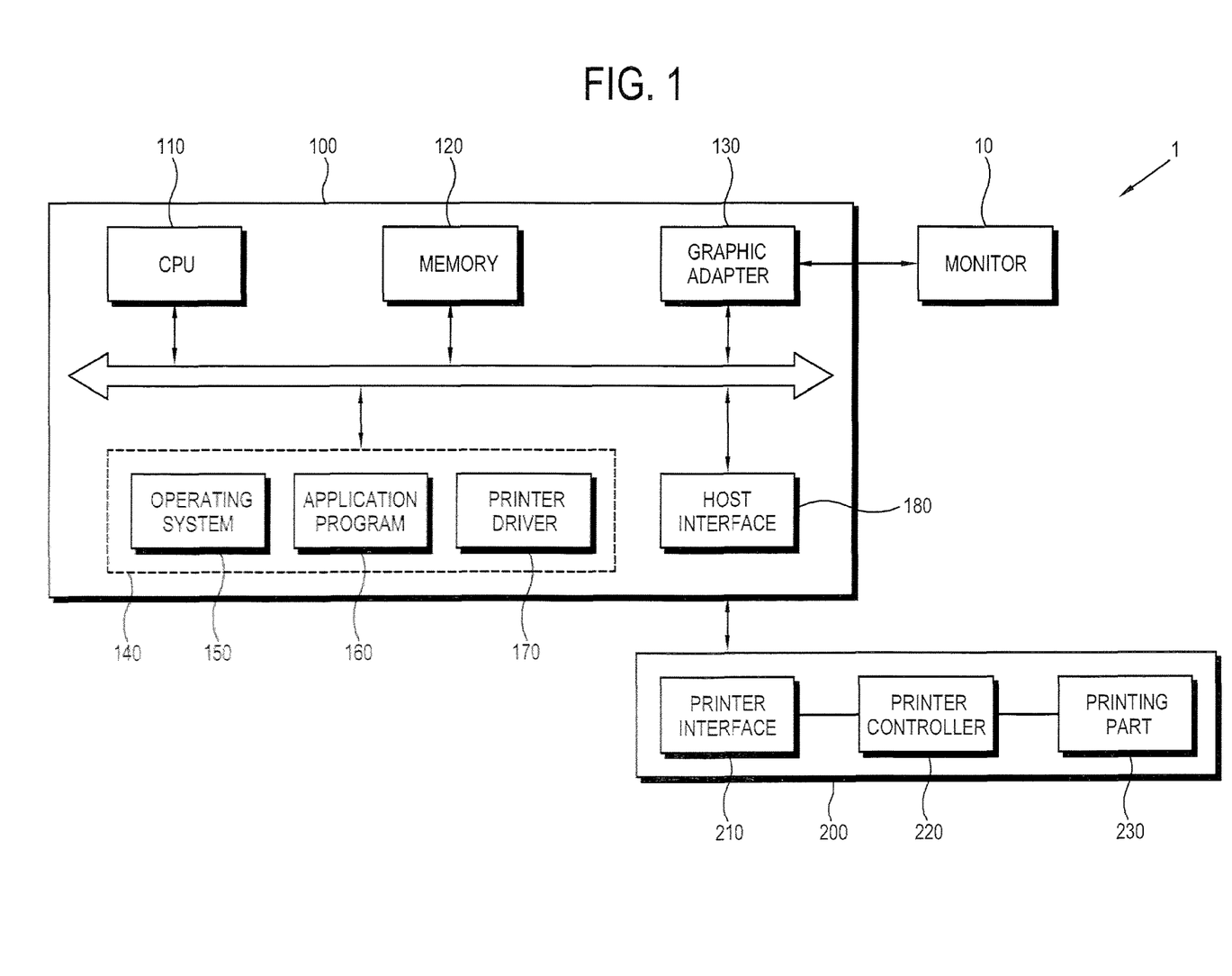
FIG. 1 is an overall view illustrating an image forming system including a host apparatus according to an exemplary embodiment of the present general inventive concept.

As illustrated in FIG. 1, an image forming system 1 according to the present general inventive concept includes a printer 200 which is used to print an image on a printing medium, such as a paper, and a host apparatus 100 which is used to output a printing data which is desired to be printed by the printer 200. In exemplary embodiments, the image forming system 1 further includes a monitor 10 connected to the host apparatus 100 which is used to display a video image according to a display signal from the host apparatus 100 on a screen of the monitor 10. The monitor 10 may be referred to as a display apparatus, and although not illustrated, the present general inventive concept includes a printer 200 with an integrated display apparatus.

In exemplary embodiments, the host apparatus 100 may include a CPU (Central Processing Unit) 110, a memory 120, a graphic adapter 130 to output the display signal to the monitor 10, and a storage unit 140.

In exemplary embodiments, the CPU 110 performs a control function and an operational function, and executes an application program 160 installed in the storage unit 140 which is associated with the memory 120.

In exemplary embodiments, the application program 160, data, and/or etc. to be executed or processed by the CPU 110 may be temporarily stored in the memory 120. In exemplary embodiments, the memory 120 may include an RAM (Random Access Memory). However, the present general inventive concept is not limited thereto.

In addition to the application program 160, an OS (Operating System) 150 and/or a printer driver 170 may be installed in the storage unit 140. In exemplary embodiments, the OS 150 may be one of series of WINDOWS™ made by Microsoft Corporation which supports a GDI (Graphic Device Interface) function. In exemplary embodiments, the application program 160 is associated with the OS 150 and may include a word processing program such as an MS-Word program, a Hangeul program, and a Jungum program. However, the present general inventive concept is not limited thereto.

In exemplary embodiments, the storage unit 140 may be provided as a hard disk drive and if necessary, it may include a flash memory. However, the present general inventive concept is not limited thereto.

Figure 2:
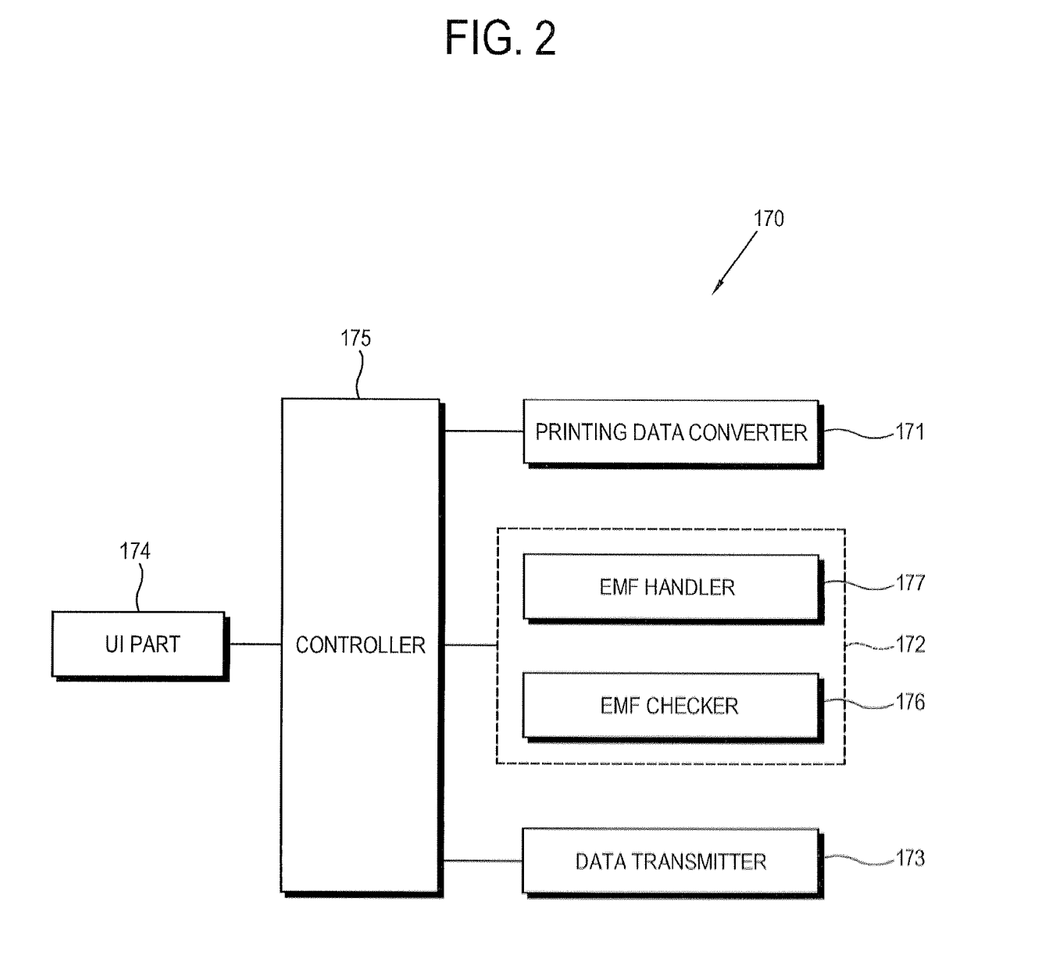
FIG. 2 is a block diagram illustrating a printer driver installed in the host apparatus illustrated in FIG. 1.

As illustrated FIG. 2, in exemplary embodiments, the printer driver 170 may include a printing data converter 171, a file processor 172, a data transmitter 173, and a controller 175.

The printing data converter 171 converts an input data into a printing data which can be recognized and processed by the printer 200. In exemplary embodiments, the printing data may include a form of a printer language such as a PCL (Printer Command Language) or a Post Script. However, the present general inventive concept is not limited thereto.

The file processor 172 includes an EMF (Enhanced Meta File) handler 177 which converts an image data made by the application program 160 into an EMF of a vector-based format and stores the EMF in the storage unit 140.

In the current exemplary embodiment, the EMF is formed by converting a text and a figure in the image data using the GDI function supported by the OS 150. However, the present general inventive concept is not limited thereto.

The EMF is relatively easy to manage due to its relatively small data size. The EMF is a type of a vector-based format file since it includes a parameter of the GDI function. In exemplary embodiments, the EMF is stored so that the image data made by the application program 160 may be recovered per a page of the original image data. A further explanation thereof will be omitted since a source of the EMF is disclosed by Microsoft Corporation, a manufacturer of the EMF.

The data transmitter 173 transmits the printing data, into which the image data is converted by the printing data converter 171, to the printer 200 via a host interface 180. However, present general inventive concept is not limited thereto.

The controller 175 controls the file processor 172 to convert the image data into the EMF and to store the converted EMF in the storage unit 140 if a printing command of the image data is initiated. In exemplary embodiments, the controller 175 also controls the printing data converter 171 to convert the image data into the printing data and controls the data transmitter 173 to transmit the converted printing data to the printer 200 if the printing command of the image data initiated.

In exemplary embodiments, the controller 175 may control an EMF checker 176, as will be described below, in order to check whether an EMF is stored in the storage unit 140, if the printing command of the image data is initiated. In the current exemplary embodiment, the checking of whether an EMF is stored in the storage unit 140 may occur prior to the converting of the image data into the printing data. The printing command of the image data may be initiated by a user in order to conduct a printing job of the image data using the application program 160.

In exemplary embodiments, if the EMF which corresponds to the image data exists in the storage unit 140, the controller 175 may control a UI (User Interface) unit 174 to generate a query UI (not illustrated) to ask a user whether the user desires to generate a new EMF of the image data and to overwrite the existing EMF with the new EMF. If the user chooses to overwrite the existing EMF, the controller 175 may control the EMF handler 177 to convert the image data into the new EMF and to overwrite the existing EMF with the new EMF. Accordingly, the existing EMF can be updated. If necessary, in exemplary embodiments, the controller 175 may control the EMF handler 177 to overwrite the existing EMF with the new EMF without asking the user if the user desires to overwrite the existing EMF.

In alternative exemplary embodiments, if the EMF which corresponds to the image data does not exist in the storage unit 140, the controller 175 controls the EMF handler 177 to convert the image data into the EMF and to store the EMF in the storage unit 140.

In exemplary embodiments, the host apparatus 100 further includes the host interface 180 which connects the host apparatus 100 with the printer 200 to thereby transmit and receive data to and from the printer 200. In exemplary embodiments, the host interface 180 may include at least one of a parallel port, a serial port, a USB (Universal Serial Bus) port and an NIC (Network Interface Card). However, the present general inventive concept is not limited thereto.

In exemplary embodiments, the printer 200 may include a printer interface 210, a printer controller 220, and a printing part 230. The printer interface 210 receives the printing data from the host apparatus 100 and is provided as at least one of a parallel port, a serial port, a USB (Universal Serial Bus) port and an NIC (Network Interface Card) which corresponds to the host interface 180. However, the present general inventive concept is not limited thereto.

In exemplary embodiments, the printer controller 220 controls an overall operation of the printer 200 and, in particular, controls the printing part 230 to print an image which corresponds to the printing data onto the printing medium, if the printing data is received through the printer interface 210.

The printing part 230 prints an image onto the printing medium and is provided as at least one of an electro-photographic type such as a laser printer, an inkjet type such as an inkjet printer, and a thermal heating type such as a THP (Thermal Heating Printer). However, the present general inventive concept is not limited thereto.

As illustrated in FIG. 2, in exemplary embodiments, the printer driver 170 further includes the EMF checker 176. The EMF checker 176 searches the EMF which is stored in the storage unit 140. In exemplary embodiments, the searching of the EMF may be implemented by checking if an extension name of a file stored in the storage unit 140 includes specific characters, such as "emf." However, the present general inventive concept is not limited thereto.

In exemplary embodiments, the controller 175 of the printer driver 170 may control the EMF checker 176 to check whether the EMF is stored in the storage unit 140 if a reprinting command is initiated.

Figure 3:
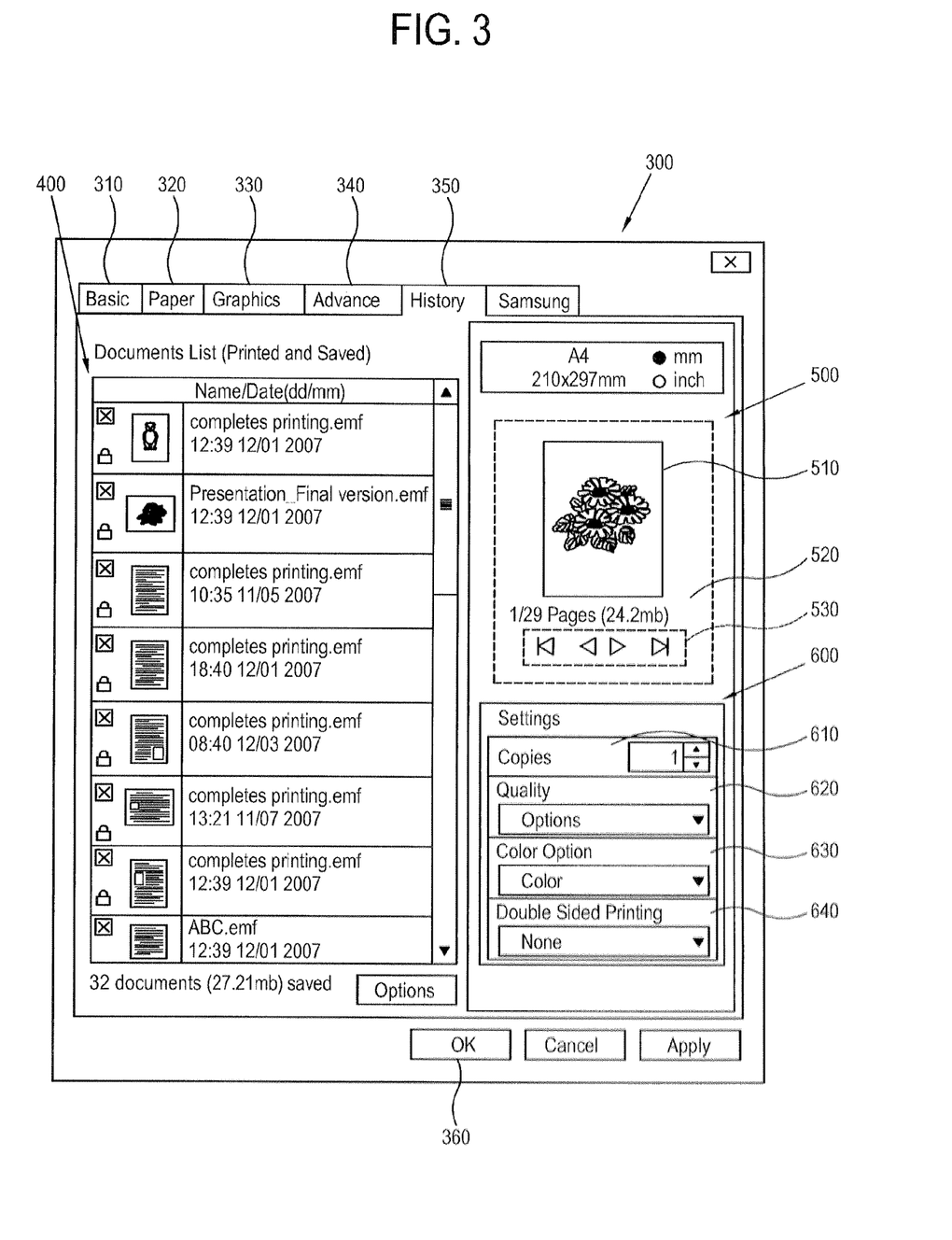
FIG. 3 is a view illustrating an exemplary integrated UI displayed in a monitor connected to the host apparatus illustrated in FIG. 1.

In the current exemplary embodiment, the reprinting command may be initiated by a user selecting a "History" menu of an integrated UI 300 illustrated in FIG. 3 which the printer driver 170 supports. However, even if the reprinting command may be initiated by a user since an image data has been previously printed and the EMF which is converted from the image data exists in the storage unit 140, in exemplary embodiments, the user may also initiate a printing command again by using the application program 150, instead of using the "History" menu of the printer driver 170. Accordingly, even if the printing command of the image data is initiated by using the application program 160, the printing command may be considered as the reprinting command in case that the EMF checker 176 determines that an EMF, which is converted from the image data, exists in the storage unit 140.

As illustrated in FIG. 2, in exemplary embodiments, the printer driver 170 further includes the UI (User Interface) part 174.

Figure 4:
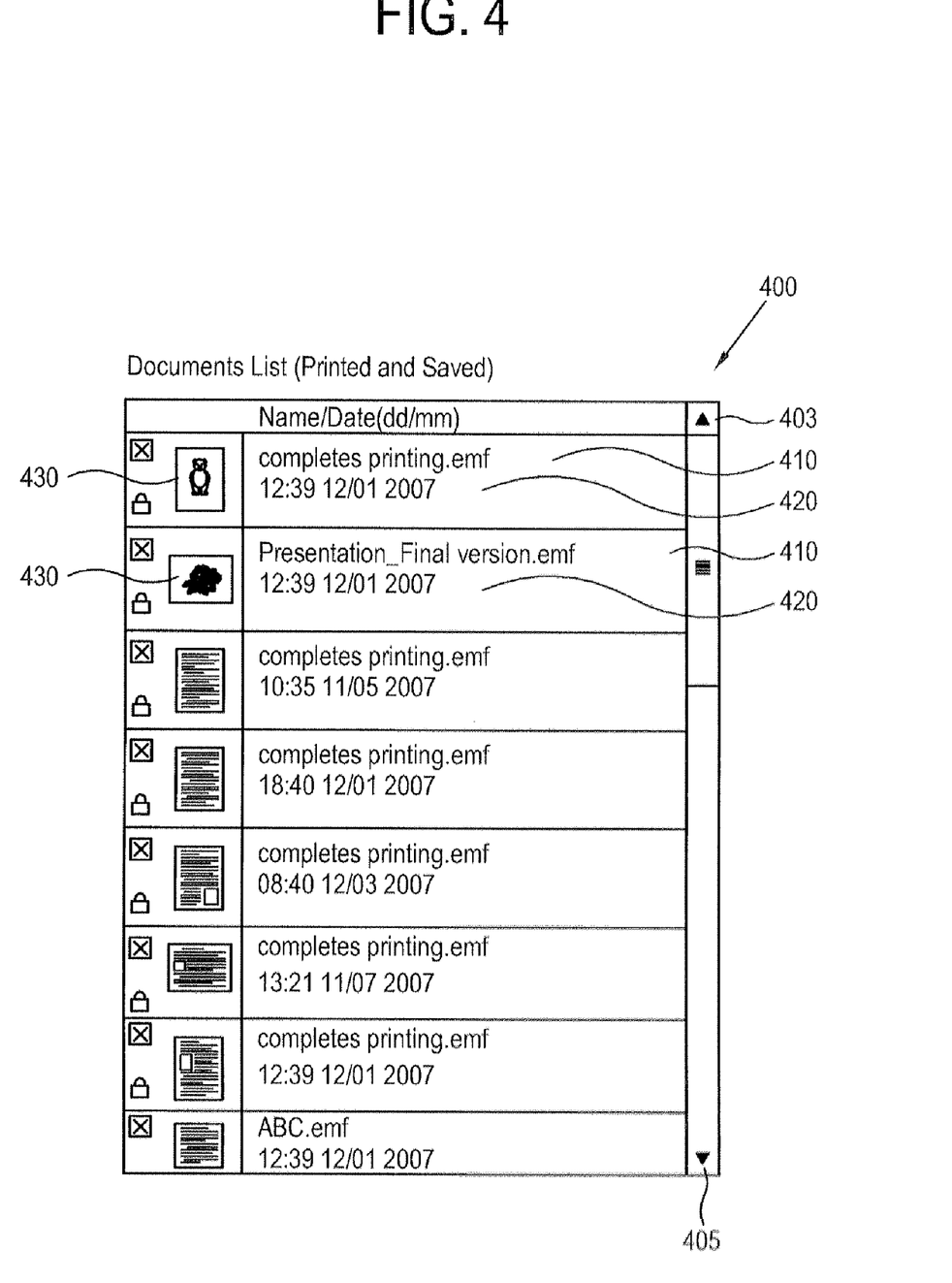
FIG. 4 is an enlarged view illustrating an EMF (Enhanced Meta File) list UI which is included by the integrated UI illustrated in FIG. 3.
Figure 5:
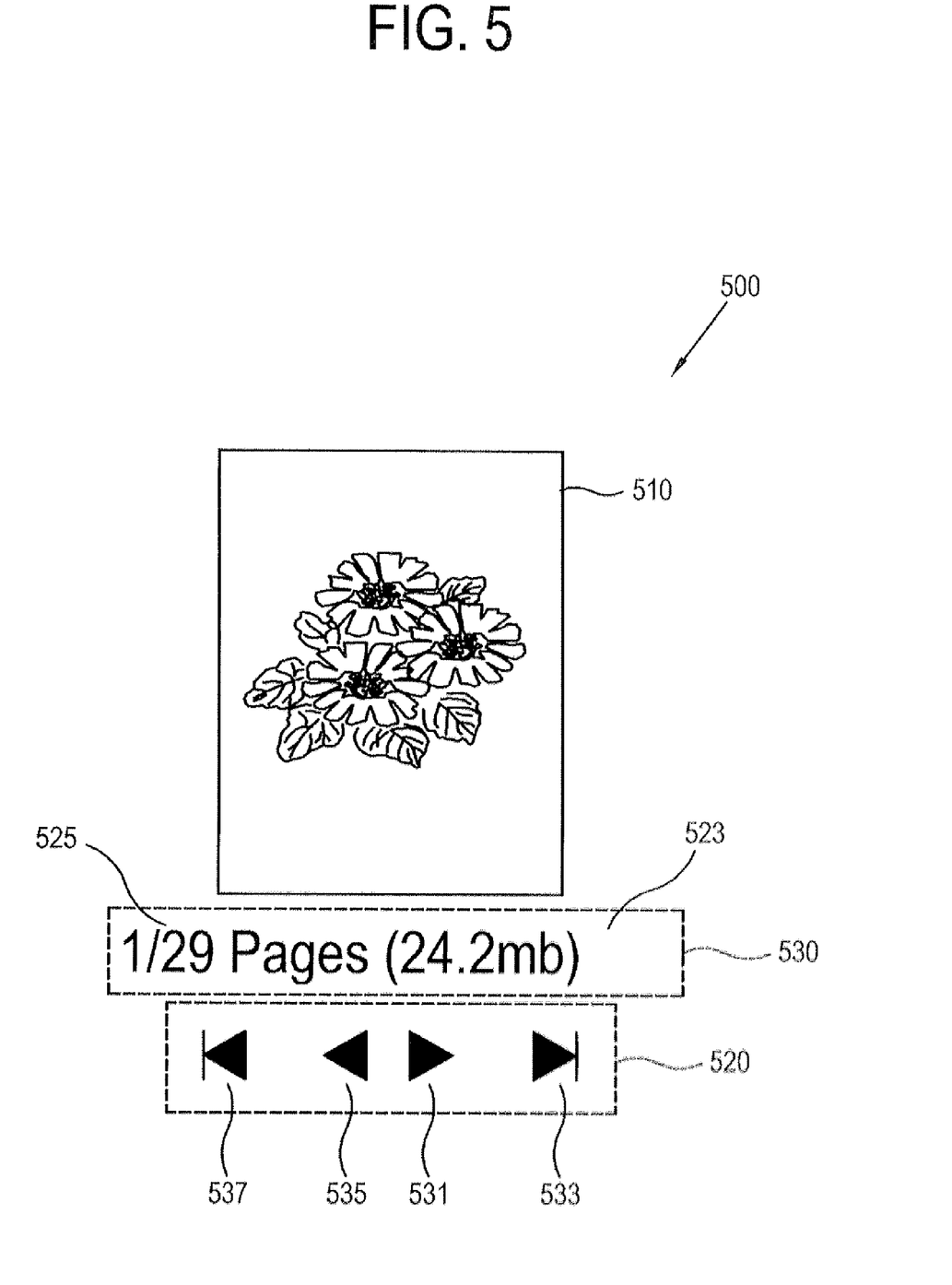
FIG. 5 is an enlarged view illustrating a preview UI which is included by the integrated UI illustrated in FIG. 3.

In exemplary embodiments, the UI part 174 may create file information UIs 400, 500 (as illustrated in FIGS. 3-5) which include information about the EMF. If necessary, the UI part 174 may create a query UI (not illustrated) to query a user whether the user desires to generate a new EMF of the image data and to overwrite the existing EMF with the new EMF.

In exemplary embodiments, as illustrated in FIG. 3, the UI part 174 may also provide a user with a variety of selection menus 310, 320, 330, 340, 350 for the user to select print options for printing.

When the EMF checker 176 completes a search of the EMF, the controller 175 of the printer driver 170 controls the UI part 174 to create the file information UIs 400, 500 according to the search result.

If the existing EMF is found in the storage unit 140 by the EMF checker 176, the controller 175 of the printer driver 170 controls the UI part 174 to create the query UI.

In the current exemplary embodiment, the file information UIs 400, 500 are provided in a "History" menu 350 of selection menus 310, 320, 330, 340, 350. That is, if a user desires to know information of a document which was previously printed and selects the "History" menu 350, the file information UIs 400, 500 may be displayed so that the user may be provided with the information with respect to the previously printed document.

As illustrated in FIG. 3, the file information UIs 400 and 500 may include a standard UI 400 to illustrate related information of the EMF and a preview UI 500 to preview a content of the EMF (also referred to as "a preview of an EMF") in the standard UI 400 selected by a user.

As illustrated in FIGS. 3 and 4, the standard UI 400 may include the related information with respect to the EMF. In the current exemplary embodiment, the related information on the EMF may include at least one of file name information 410 of the EMF, date information 420 with respect to the EMF, and a thumbnail 430 of the EMF.

In exemplary embodiments, the date information 420 illustrates a time when an original document of the image data was made and/or a time when the EMF was previously printed. However, the present general inventive concept is not limited thereto.

In the current exemplary embodiment, the thumbnail 430 may be a reduced image of one of the pages of an image in the EMF. The one of the pages may be a first page of the image in the EMF. However, the present general inventive concept is not limited thereto.

In exemplary embodiments, the standard UI 400 may further include an upper direction scroll bar 403 and a lower direction scroll bar 405 for a user to search the EMF in a window if a plurality of EMFs exist.

As illustrated in FIGS. 3 and 5, the preview UI 500 may include a preview window 510 of the EMF which is selected by a user in the standard UI 400.

In exemplary embodiments, the preview window 510 may be implemented by loading the selected EMF in the standard UI 400 and rendering it to fit into a size of the preview window 510. In an exemplary embodiment, the preview window 510 is provided to preview a content of a first page of the selected EMF. However, the present general inventive concept is not limited thereto.

In exemplary embodiments, the preview UI 500 may further include play buttons 531, 535 and jump play buttons 533, 537 for a user to identify contents of the selected EMF per a page. In an exemplary embodiment, if a user clicks a forward play button 531, the user can preview an image of a next page of the image currently previewed. In alternative exemplary embodiments, if the user clicks a backward play button 535, the user can preview an image of a previous page of the image currently previewed. In further exemplary embodiments, the jump play buttons 533, 537 may be used if the user desires to preview an image of a page at 2 or more pages next to or previous to the image currently previewed. In exemplary embodiments, the play buttons 531, 535 and the jump play buttons 533, 537 is provided in a control region 520 of the preview UI 500. However, the present general inventive concept is not limited thereto.

In exemplary embodiments, the preview UI 500 may further include an additional information UI 523 to illustrate at least one of page number information 525 which indicates a page number of a currently previewed page in the EMF with respect to a total number of pages and a file size information 523 of a currently previewed EMF. In exemplary embodiments, the additional information UI 523 is provided in an information region 530 of the preview UI 500. However, the present general inventive concept is not limited thereto.

The UI part 174 creates a print option setting UI 600 for a user to set a print option when the user prints the EMF on a printing medium.

As illustrated in FIG. 3, the print option setting UI 600 may further include a copy option 610 to set the number of sheets to be copied, a quality option 620 to set printing quality, a color option 630 to set color or mono printing, and a double sided print option 640 to set a single sided printing or a double sided printing. However, the present general inventive concept is not limited thereto, that is a variety of other options may be supported and/or the above described options may be modified as required.

In exemplary embodiments, the UI part 174 may create the integrated UI 300 to illustrate the file information UIs 400, 500 and the print option setting UI 600 in a single screen simultaneously Accordingly, a user views related information on a stored EMF, selects an EMF to be printed, and identifies a detail contents of the selected EMF via a preview window 510. Then, the user may print the EMF according to the detailed identification. If necessary, the user can set a print option desired to print the EMF via the print option setting UI 600. Therefore, in an exemplary embodiment, a user not only prints an image data without an application program 160, but also searches the EMF stored in the storage unit 140 and identifies the contents of the searched EMF without a separate viewer program for the EMF. Furthermore, it is more convenient since a user can set a print option via the print option setting UI 600 in printing the EMF.

In the above description, as illustrated in FIG. 2, the printer driver 170 includes the file processor 172, the UI part 174, the printing data converter 171, and the data transmitter 173. However, in alternative exemplary embodiments, a portion or all of the file processor 172, the UI part 174, the printing data converter 171, and the data transmitter 173 may be provided in the application program 160. In an exemplary embodiment, the UI part 174 may be provided in the application program 160 and the preview UI 500 may be provided in a printing menu of the application program 160.

Figure 6A:
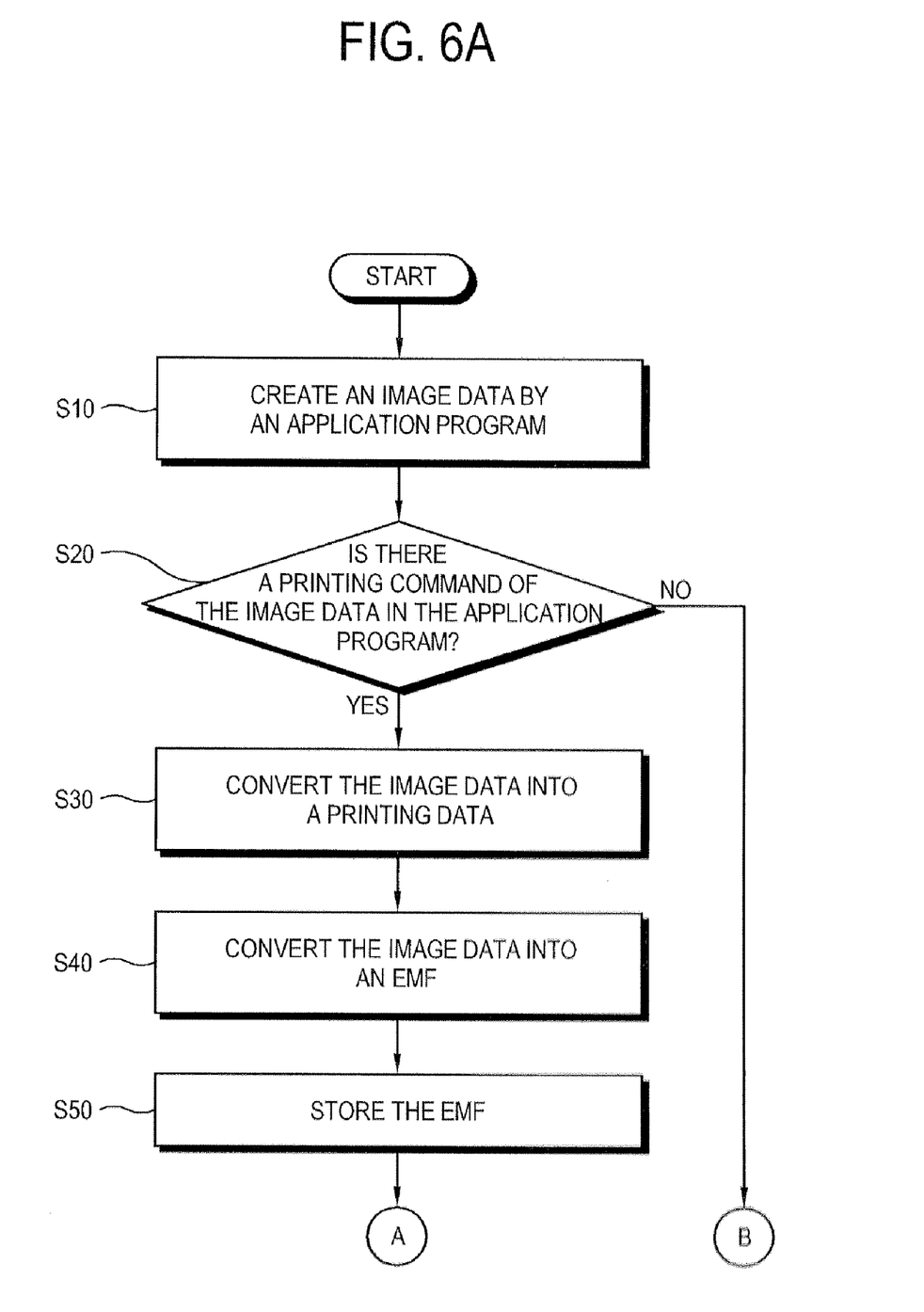
FIGS. 6A and 6B are flow charts illustrating a printing method according to an exemplary embodiment of the present general inventive concept.
Figure 6B:
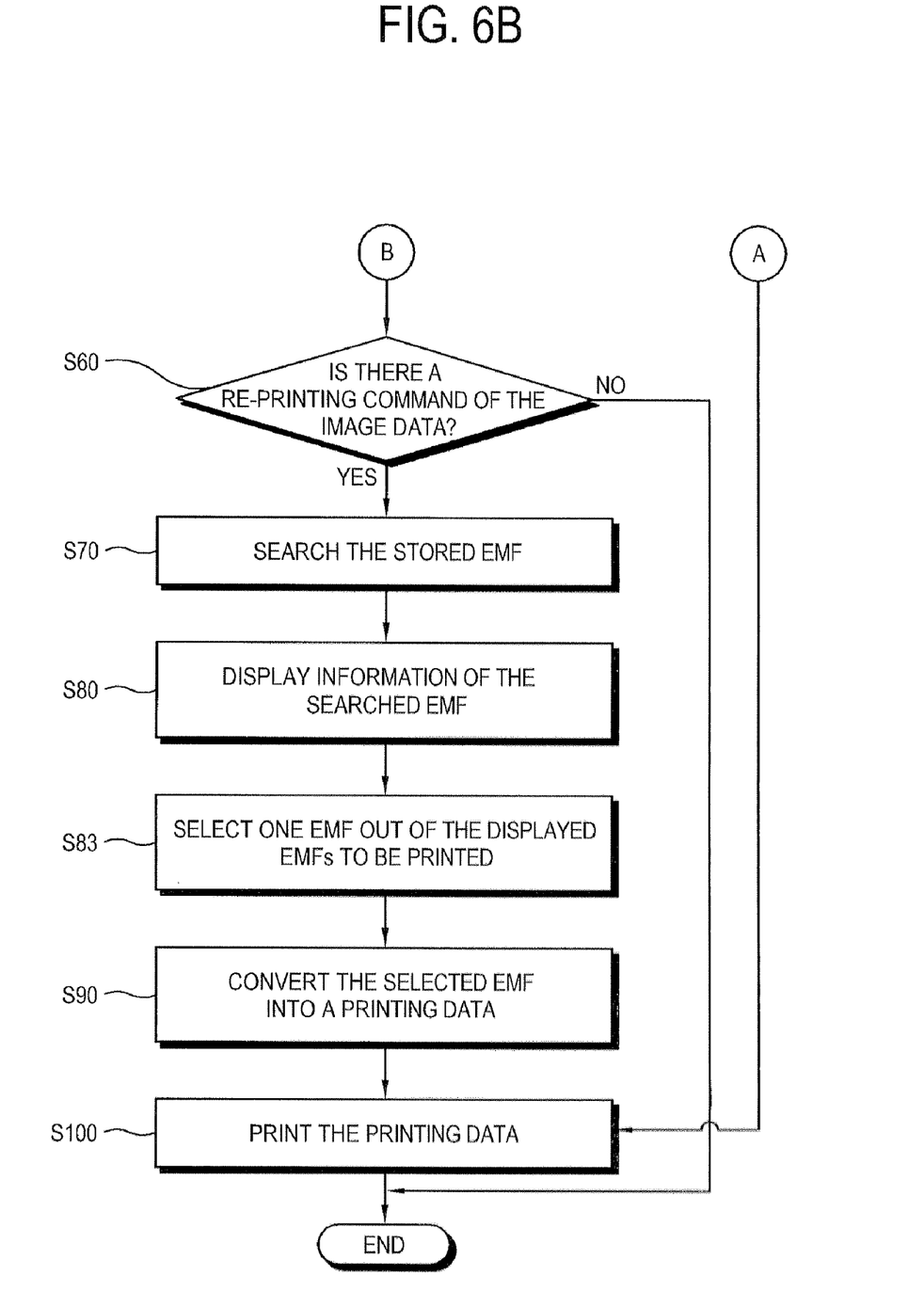

A printing method according to the present general inventive concept will now be described with reference to FIGS. 6A and 6B.

First, a user creates an image data, which is to be printed, by using an application program (S10). In exemplary embodiments, the operation S10 may be omitted since the image data is not created by the user and may be received from an external source (not illustrated).

Next, in operation 220, it is determined whether a printing command of the image data is given in the application program (S20).

If the printing command is given (S20), the image data is converted into a printing data and an EMF (S30, S40). In the current exemplary embodiment, operations S30 and S40 may be performed in alternate to each other.

In exemplary embodiments, the printing method may further include an operation of searching the EMFs which were previously converted from the image data in the storage unit 140 in case that the printing command is given in the application program.

After searching, if the converted EMF is found in the storage unit 140, the operation of converting the EMF previously stored in the storage unit 140 into a printing data (S90) and printing the printing data (S100) may be directly performed, so that the printing command of the image data may be accomplished. However, the present general inventive concept is not limited thereto.

In exemplary embodiments, the printing method may further include an operation of determining whether the previously converted EMF from the image data is stored in the storage unit 140, in case that the printing command is given in the application program.

In exemplary embodiments, if it is determined that the previously converted EMF exists in the storage unit 140, the printing method may further include an operation of querying a user if the user wants to create a new EMF from the image data and to overwrite the previously converted EMF with the new EMF. If necessary, the operation of creating a new EMF and overwriting the previously converted EMF with the new EMF may be automatically performed without querying a user. Therefore, the existing EMF may be updated into a new EMF and the new EMF may be stored in the storage unit 140.

After operation S40, the converted EMF is stored (S50) and then the operation of printing the printing data S100 is performed. In the current exemplary embodiment, the operation of printing the printing data S100 will be described in more detail below.

The printing data is transmitted to the printer 200 via host interface 180. The printer controller 220 converts the printing data which is received through the printer interface 210 into a bitmap data and transmits the bitmap data to the printing part 230. Then, the printing part 230 forms an ink dot or a toner dot on a printing medium according to the bitmap data so that the printing is thereby accomplished.

If the printing command from the application program 160 is not given (S20), it is determined whether a reprinting command of the image data is given (S60). As described above, it is regarded as the reprinting command that a user gives a printing command by using a specific menu (i.e. "History" menu) in the integrated UI 300 which is supported by the printer driver 170. In exemplary embodiments, the operation S60 which determines whether the reprinting command is given may be performed independently of the operation S20.

If the reprinting command is given, the EMF stored in the storage unit 140 by operation S50 is searched (S70).

Then, information with respect to the searched EMF is displayed (S80). In the current exemplary embodiment, the operation S80 which displays information about the searched EMF may further include displaying related information with respect to the searched EMF. Here, the related information of the EMF, as described above, may include at least one of file name information 410 of the EMF, date information 420 with respect to the EMF, and a thumbnail 430 of the EMF.

In exemplary embodiments, the printing method may further include previewing contents of one EMF of a plurality of the EMFs selected by a user, in which the related information on the selected EMF is displayed. A more detailed explanation of the previewing will be omitted since it was described above with respect to the standard UI 400 and the preview UI 500, referring to FIGS. 3 through 5.

Here, the previewing of contents of the selected EMF may be configured to preview contents of a first page thereof. The previewing of contents of the selected EMF, as illustrated in FIG. 3, is provided through a specific menu (i.e. "History" menu) of the printer driver 170. If necessary, the previewing of contents of the selected EMF is provided through an application program. However, in alternative exemplary embodiments, the previewing may be omitted.

If a user selects one EMF out of the plurality of EMFs to be printed (S83), the selected EMF is converted into a printing data (S90). In exemplary embodiments, the conversion may be performed by the printing data converter 171 of the printer driver 170. The converted printing data is transmitted via the host interface 180 to the printer 200 and the printer 200 prints the received printing data on a printing medium.

A printing method, a recordable medium recorded with a program to execute the method, and a host apparatus according to present general inventive concept provide the following effects.

First, an EMF of a vector-based format, which is converted from an image data created by an application program, is stored at the same time when an image data is printed. It is possible to easily reprint the image data since the stored EMF is used in reprinting. It is also convenient to manage the EMF since the size of the file is relatively small.

Second, the stored EMF is searched and, the contents of the stored EMF are displayed as a preview, so that a user may easily identify the contents of the stored EMF to print the image data.

Third, a previously printed image data is searched and displayed to a user, so that the user can easily find it. Moreover, a user may more conveniently search the previously printed image data and reprint the same image data because the searching of the stored EMF and the previewing of the contents of the stored EMF are performed by using a printer driver in itself.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in the foregoing exemplary embodiments without departing from the principles and spirit of the general inventive concept, the scope of which is defined in the appended claims and their equivalents.

What is claimed is:

1. A printing method, the method comprising:
   converting an image data which is created by an application program into an EMF (Enhanced Meta File), the EMF having a vector-based format;
   storing the EMF converted from the image data;

displaying information with respect to the stored EMF;
selecting at least one stored EMF of a plurality of the stored EMFs; and
converting the at least one selected EMF into a printing data.

2. The printing method according to claim 1, further comprising:
searching the EMF, wherein the information with respect to the EMF to be searched is not displayed.

3. The printing method according to claim 1, wherein the information with respect to the stored EMF comprises at least one of a preview of the stored EMF and related information with respect to the stored EMF.

4. The printing method according to claim 3, wherein the displaying comprises displaying the preview corresponding to the selected EMF.

5. The printing method according to claim 3, wherein the preview of the stored EMF corresponds to a first page of the stored EMF.

6. The printing method according to claim 3, wherein the preview of the stored EMF corresponds to at least one page of pages of the stored EMF selected by a user.

7. The printing method according to claim 1, wherein the displaying comprises displaying the information in a printing menu provided by at least one of the application program and a printer driver.

8. The printing method according to claim 1, further comprising:
checking whether the EMF converted from the image data is stored if a printing command of the image data is initiated.

9. The printing method according to claim 8, further comprising:
querying a user on whether a new EMF is created from the image data if it is determined that the EMF converted from the image data is stored.

10. The printing method according to claim 8, further comprising:
creating a new EMF from the image data if it is determined that the EMF converted from the image data is stored; and
overwriting the previously converted EMF with the new EMF.

11. The printing method according to claim 1, further comprising:
printing the converted printing data.

12. A non-transitory computer readable medium storing a program to execute a printing method of an image forming apparatus, the printing method comprising:
converting an image data which is created by an application program into an EMF (Enhanced Meta File), the EMF having a vector-based format;
storing the EMF converted from the image data;
displaying information with respect to the stored EMF;
selecting at least one stored EMF of a plurality of stored EMFs;
converting the selected EMF into a printing data; and
printing the converted printing data.

13. A host apparatus connected to a printer, comprising:
a storage unit;
a printer driver to be installed in the storage unit and to drive the printer;
an application program installed in the storage unit;
a file processor to convert an image data created by the application program into an EMF (Enhanced Meta File) and to store the EMF in the storage unit, the EMF having a vector-based format;
a printing data converter to convert an image data into a printing data;
a data transmitter to transmit a data to the printer; and
a controller to control the file processor to convert the image data into the EMF and to store the EMF in the storage unit, to control the printing data converter to convert the EMF into the printing data and to control the data transmitter to transmit the printing data to the printer if a printing command of the image data is initiated.

14. The host apparatus according to claim 13, further comprising an EMF checker to search the EMF stored in the storage unit,
wherein the controller the EMF checker to search the EMF stored in the storage unit if the printing command of the image data is initiated.

15. The host apparatus according to claim 13, further comprising:
a UI (user interface) part, and
wherein the controller the UI part to create a query UI to query a user on whether a new EMF is created from the image data if it is determined that the previously converted EMF of the image data is stored in the storage unit.

16. The host apparatus according to claim 13, further comprising a UI (user interface) part to create a file information UI to display information of the stored EMF on a display apparatus according to the control of the controller.

17. The host apparatus according to claim 16, wherein the file information UI comprises at least one of a standard UI to display related information on the stored EMF and a preview UI to preview contents of the EMF.

18. The host apparatus according to claim 17, wherein the preview UI is provided by at least one of the printer driver and the application program.

19. An image forming apparatus, comprising:
an image forming unit;
a controller which receives a first signal representing at least one Enhanced Meta File (EMF) of an image data, the at least one EMF of the image data having a vector-based format, stores the first signal representing the at least one EMF of an image data, converts the first signal representing the at least one EMF of an image data into a second signal representing a printing data, generates a display signal to display information corresponding to the at least one EMF, and transmits the second signal to the image forming unit.

20. A printing method of an image forming apparatus, the method comprising:
converting a first signal representing an image data file into a second signal representing an Enhanced Meta File (EMF), the EMF having a vector-based format;
storing the second signal representing the EMF;
transmitting a display signal representing information with respect to the stored second signal;
converting the second signal into a print signal representing a print data; and
printing according to the print signal.

* * * * *